(12) United States Patent
Mizuno et al.

(10) Patent No.: US 8,946,334 B2
(45) Date of Patent: Feb. 3, 2015

(54) RUBBER COMPOSITION FOR TIRES AND PNEUMATIC TIRE USING THE SAME

(75) Inventors: Yoichi Mizuno, Kobe (JP); Toshikazu Kondo, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 110 days.

(21) Appl. No.: 12/601,995

(22) PCT Filed: Mar. 7, 2008

(86) PCT No.: PCT/JP2008/054115
§ 371 (c)(1),
(2), (4) Date: Nov. 25, 2009

(87) PCT Pub. No.: WO2008/149585
PCT Pub. Date: Dec. 11, 2008

(65) Prior Publication Data
US 2010/0190907 A1    Jul. 29, 2010

(30) Foreign Application Priority Data

Jun. 6, 2007 (JP) ................................. 2007-150257
Jun. 8, 2007 (JP) ................................. 2007-153024

(51) Int. Cl.
| | | |
|---|---|---|
| C08K 3/34 | (2006.01) | |
| C08K 3/00 | (2006.01) | |
| C08L 7/00 | (2006.01) | |
| C08L 15/00 | (2006.01) | |
| C08C 19/06 | (2006.01) | |
| C08K 3/36 | (2006.01) | |

(52) U.S. Cl.
CPC ................. C08K 3/0033 (2013.01); C08L 7/00 (2013.01); C08L 15/00 (2013.01); C08C 19/06 (2013.01); C08K 3/36 (2013.01); B60C 2015/0614 (2013.01)
USPC ........... 524/426; 524/433; 524/437; 524/445; 524/449; 524/575.5

(58) Field of Classification Search
USPC ........................................................ 524/426
See application file for complete search history.

(56) References Cited

U.S. PATENT DOCUMENTS

| | | | |
|---|---|---|---|
| 7,087,660 B2 * | 8/2006 | Maier et al. ................... 522/83 |
| 7,307,116 B2 | 12/2007 | Mizuno | |
| 7,767,734 B2 * | 8/2010 | Hochi ........................... 523/153 |
| 2002/0037950 A1 * | 3/2002 | Mizuno et al. .................. 524/35 |
| 2002/0068784 A1 | 6/2002 | Rauline | |
| 2003/0100643 A1 | 5/2003 | Kikuchi | |
| 2003/0100661 A1 | 5/2003 | Kikuchi et al. | |
| 2004/0249045 A1 * | 12/2004 | Goodman et al. ............ 524/447 |
| 2005/0209394 A1 | 9/2005 | Sandstrom et al. | |
| 2005/0215692 A1 * | 9/2005 | Hochi ............................ 524/445 |
| 2006/0118227 A1 | 6/2006 | Miki | |
| 2006/0183840 A1 * | 8/2006 | Hirayama et al. ............ 524/493 |

FOREIGN PATENT DOCUMENTS

| | | |
|---|---|---|
| EP | 1288022 A1 | 3/2003 |
| EP | 1288253 A1 | 3/2003 |
| EP | 2147951 A1 | 1/2010 |
| JP | 2002-105245 A | 4/2002 |
| JP | 2002-226629 A | 8/2002 |
| JP | 2002-338734 A | 11/2002 |
| JP | 2003-63206 A | 3/2003 |
| JP | 2003-64222 A | 3/2003 |
| JP | 2005-2287 A | 1/2005 |
| JP | 2005-53944 A | 3/2005 |
| JP | 2006-89526 A | 4/2006 |
| JP | 2006159945 A | 6/2006 |
| JP | 2006-219631 A | 8/2006 |
| JP | 2006-306965 A | 11/2006 |
| JP | 2006-342262 A | 12/2006 |
| JP | 2007-191677 A | 8/2007 |
| JP | 4768521 B2 | 9/2011 |
| RU | 2 250 834 C2 | 8/2003 |
| RU | 2 266 932 C2 | 4/2004 |
| WO | WO 01/85837 A2 | 11/2001 |

OTHER PUBLICATIONS

Russian Office Action for corresponding Application No. 2009143274/05 dated Aug. 9, 2012.
Japanese Office Action with the English translation dated Mar. 21, 2012, for Application No. 2007-150257.
Japanese Office Action with the English translation dated Mar. 6, 2012, for Application No. 2007-153024.
Korean Office Action dated Mar. 27, 2014 issued in Korean Patent Application No. 10-2009-7026290.

* cited by examiner

*Primary Examiner* — Doris Lee
(74) *Attorney, Agent, or Firm* — Birch, Stewart, Kolasch & Birch, LLP

(57) ABSTRACT

A rubber composition for tires, which includes a rubber component containing a natural rubber component consisting of at least either a natural rubber or an epoxidized natural rubber, and an inorganic filler containing silica, and a pneumatic tire using such a rubber composition for tires are provided. The rubber composition can be used as a rubber composition for clinch apex, and in this case, the rubber component preferably consists of the natural rubber component, with the inorganic filler being contained in a range of 50 to 80 parts by mass and carbon black being contained in a range of 2 to 5 parts by mass relative to 100 parts by mass of the rubber component. The rubber composition for tires can be used as a rubber composition for a bead apex, and in this case, the inorganic filler contains silica and clay, and the compounding amount of the clay is set in a range of 5 to 40 parts by mass relative to 100 parts by mass of the rubber component, with the total compounding amount of the silica and clay being set to 65 parts by mass or more relative to 100 parts by mass of the rubber component.

6 Claims, 1 Drawing Sheet

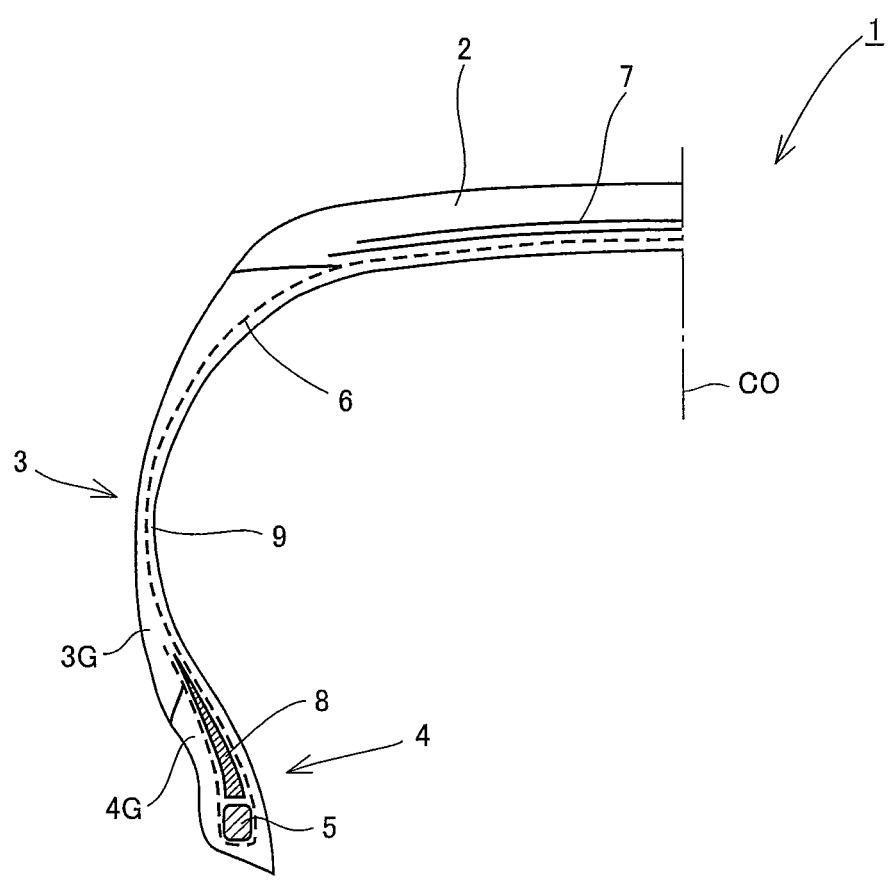

RUBBER COMPOSITION FOR TIRES AND PNEUMATIC TIRE USING THE SAME

TECHNICAL FIELD

This invention relates to a rubber composition used for tires, and more specifically, relates to a rubber composition for clinch apex and a rubber composition for bead apex for use in pneumatic tires. Moreover, the present invention also relates to a pneumatic tire provided with a clinch apex rubber or a bead apex rubber composed of the rubber composition.

BACKGROUND ART

A clinch apex rubber is placed on a portion chafing against a rim of a pneumatic tire. The clinch apex rubber has functions for transmitting a driving force from the rim to the tire during driving and for holding the load of the tire. Therefore, the clinch apex rubber needs to have high hardness and superior heat aging resistance. Moreover, in order to reduce abrasion that occurs due to frictional contact with the rim caused by repetitive deformations of the during driving, the clinch apex rubber also needs to have a predetermined abrasion resistant property. Furthermore, since physical characteristics, such as rigidity, hardness and mechanical strength, of the clinch apex rubber give big influences to the steering stability performance during driving, these characteristics should be set within an appropriate range.

Along with the improvements of automobile performances in recent years, there also have been strong demands for high steering stability in tires. In order to obtain a tire having high steering stability, it is necessary to improve the rigidity of bead apex rubber. Conventionally, in order to improve the rigidity of the bead apex rubber, a large amount of carbon black is blended in a rubber composition for the bead apex.

To add a large amount of carbon black is effective to allow the bead apex to have high rigidity; however, this causes the problem that heat is easily generated in the tire during driving. When heat is generated, a fatigue resistant property of the tire is lowered to impair the durability, and a tire rolling resistance increases due to an increase in rubber loss tangent (tan δ) to cause an increase in fuel costs.

On the other hand, in recent years, environmental issues have been regarded as important, and regulations against $CO_2$ emissions have been tightened. Moreover, petroleum resources are limited, and there is a possibility that a supply of materials derived from the petroleum resources, such as carbon black, might become difficult in the future, and at the same time, it is predicted that oil prices rises suddenly because of reducing the amount of the supply year by year. Therefore, there have been strong demands for replacing the materials derived from petroleum resources with materials derived from resources other than the petroleum resources.

At present, half or more of the entire weight of each of tires that are commercially available in general is composed of materials derived from petroleum resources. For example, since the general tire for a passenger car contains about 20% by mass of synthetic rubber, about 20% by mass of carbon black, a softening agent and synthetic fibers, about 50% by mass or more of the entire tire is composed of materials derived from petroleum resources. Therefore, there have been strong demands for the developments of a rubber for tires that is formed by using materials derived from natural resources, and satisfies required characteristics that are the same as, or superior to those of the rubber for tires made by using materials derived from petroleum resources.

Japanese Patent Laying-Open No. 2003-64222 (Patent Document 1) has proposed a rubber composition that contains 5 to 150 parts by weight of an inorganic filler, 0 to 30 parts by weight of a silane coupling agent and 5 to 100 parts by weight of vegetable fat and oil having an iodine value of 130 or less, relative to 100 parts by mass of diene-based rubber, in order to reduce the rolling resistance.

In order to provide a rubber composition for tread and a pneumatic tire that can greatly improve a wet-gripping performance without degradation in the tire abrasion resistance and rolling resistance characteristic, Japanese Patent Laying-Open No. 2002-105245 (Patent Document 2) has disclosed a rubber composition for tread which is composed of (A) 100 parts by weight of rubber components that include a diene-based rubber or a mixture of a natural rubber and a diene-based rubber, with at least 20% by weight of styrene-butadiene rubber being contained therein, (B) 5 to 50 parts by weight of clay, (C) 5 parts by weight or more of silica having a nitrogen adsorption specific surface area of 100 to 300 $m^2/g$ and (D) 1 part by weight or more of carbon black having a nitrogen adsorption specific surface area of 70 to 300 $m^2/g$, with the total amount of (B) clay and (C) silica being set to 30 parts by weight or more and the total amount of (B) clay, (C) silica and (D) carbon black being set to 100 parts by weight or less.

In order to provide a rubber composition for base tread that can reduce fuel costs of a car during driving and a tire using such a rubber composition, Japanese Patent Laying-Open No. 2005-2287 (Patent Document 3) has disclosed a rubber composition for base tread which contains 1 to 20 parts by weight of a composite material composed of starch and a plasticizer, relative to 100 parts by weight of rubber components composed of a natural rubber and a butadiene rubber.

In order to provide a rubber composition for side wall that can reduce fuel costs of a car during driving and a tire using such a rubber composition, Japanese Patent Laying-Open No. 2005-53944 (Patent Document 4) has disclosed a rubber composition for side wall which contains 1 to 20 parts by weight of a composite material composed of starch and a plasticizer, relative to 100 parts by weight of rubber components composed of a natural rubber and/or an isoprene rubber as well as a butadiene rubber.

In order to provide a rubber composition for tires that can maintain performances required for tire members, such as air permeation resistance, flex cracking resistance and proper hardness, and also improves the processability, and a tire obtained by such a rubber composition, Japanese Patent Laying-Open No. 2006-89526 (Patent Document 5) has disclosed a rubber composition for tires which contains 30 parts by weight or more of silica, 5 to 15 parts by weight of calcium carbonate and 5 parts by weight or less of carbon black, relative to 100 parts by weight of rubber components composed of a natural rubber and/or its modified material.

In order to provide a rubber composition for breaker that is well balanced in performances, such as rigidity, heat resistance, adhesive property, adhesive property under wet and heat conditions and elongation performance, and a tire using such a rubber composition as a breaker layer or a belt layer, Japanese Patent Laying-Open No. 2002-338734 (Patent Document 6) has disclosed a rubber composition for breaker which contains 55 to 65 parts by weight of carbon black, 5 to 15 parts by weight of silica, 3.5 to 4.5 parts by weight of sulfur, 0.08 parts by weight or more of cobalt, a resorcine-based resin and methylene donator, relative to 100 parts by weight of rubber components mainly composed of a natural rubber and/or isoprene rubber.

However, the above-mentioned prior-art compositions have failed to provide a rubber composition for clinch apex that can reduce the amount of use of materials derived from petroleum resources, and is superior in crack resistant property and processability upon preparation, with a low heat-generating property, as well as a rubber composition for bead apex that has high rigidity and a low heat-generating property, and is superior in processability upon preparation, and a pneumatic tire using these.

Patent Document 1 Japanese Patent Laying-Open No. 2003-64222
Patent Document 2 Japanese Patent Laying-Open No. 2002-105245
Patent Document 3 Japanese Patent Laying-Open No. 2005-2287
Patent Document 4 Japanese Patent Laying-Open No. 2005-53944
Patent Document 5 Japanese Patent Laying-Open No. 2006-89526
Patent Document 6 Japanese Patent Laying-Open No. 2002-338734

DISCLOSURE OF THE INVENTION

Problems to be Solved by the Invention

The present invention has been proposed so as to solve the above-mentioned problems, and its objective is to provide a rubber composition for tires that can reduce the amount of use of materials derived from petroleum resources, with energy conservation and environmental protection being sufficiently taken into consideration, and even when the rubber composition is used for either of portions of a clinch apex rubber and a bead apex rubber, it exerts superior performances, and satisfies characteristics required for respective portions.

Another objective of the present invention is to provide a pneumatic tire provided with a clinch apex rubber or a bead apex rubber composed of the above-mentioned rubber composition.

Means for Solving the Problems

The rubber composition for tires according to the present invention contains a rubber component containing a natural rubber component consisting of at least either a natural rubber (NR) or an epoxidized natural rubber (ENR) and an inorganic filler containing at least silica. The rubber composition for tires according to the present invention is desirably used for manufacturing a clinch apex rubber and a bead apex rubber for a tire.

When the rubber composition for tires according to the present invention is used as a rubber composition (hereinafter, referred to as a rubber composition for clinch apex) to be used for manufacturing a clinch apex rubber, the rubber component is consists of the natural rubber component, with the inorganic filler being preferably contained therein in a range of 50 to 80 parts by mass relative to 100 parts by mass of the rubber component, and carbon black is preferably contained in a range of 2 to 5 parts by mass, relative to 100 parts by mass of the rubber component.

In the rubber composition for clinch apex according to the present invention, the inorganic filler may consist of at least one material selected from the group consisting of calcium carbonate, aluminum hydroxide, clay, mica and magnesium oxide, and silica, and in this case, the sum of compounding amounts of the calcium carbonate, aluminum hydroxide, clay, mica and magnesium oxide is desirably set to 20 parts by mass or more relative to 100 parts by mass of the rubber components.

Here, in the rubber composition for clinch apex according to the present invention, the inorganic filler may consist of silica.

When the rubber composition for tires according to the present invention is used as a rubber composition (hereinafter, referred to as a rubber composition for bead apex) to be used for manufacturing a bead apex rubber, the inorganic filler contains at least silica and clay, and the compounding amount of the clay is set in a range of 5 to 40 parts by mass relative to 100 parts by mass of the rubber component, with the total compounding amount of the silica and clay is desirably set to 65 parts by mass or more relative to 100 parts by mass of the rubber components.

The rubber composition for bead apex according to the present invention may further contain carbon black. The compounding amount of the carbon black is set to 5 parts by mass or less relative to 100 parts by mass of the rubber component.

In the rubber composition for bead apex according to the present invention, the compounding amount of the inorganic filler is set to 70 parts by mass or more relative to 100 parts by mass of the rubber component.

In the rubber composition for bead apex according to the present invention, the rubber component preferably consists of the natural rubber component.

In the rubber composition for bead apex according to the present invention, the durometer hardness thereof is preferably set in a range from 70 to 95.

Moreover, the present invention provides a pneumatic tire that has a clinch apex rubber or a bead apex rubber consisting of the above-mentioned rubber composition for tires.

Effects of the Invention

The present invention makes it possible to provide a rubber composition for tires that can reduce the amount of use of materials derived from petroleum resources, with energy conservation and environmental protection being sufficiently taken into consideration, and even when the rubber composition is used for either of portions of a clinch apex rubber and a bead apex rubber, it exerts superior performances, and satisfies characteristics required for respective portions, and the present invention also provides a pneumatic tire provided with a clinch apex rubber or a bead apex rubber consisting of the above-mentioned rubber composition for tires.

BRIEF DESCRIPTION OF THE DRAWINGS

FIG. 1 is a cross-sectional view showing a left half portion of a pneumatic tire in accordance with the present invention.

DESCRIPTION OF THE REFERENCE SIGNS

1 Tire, 2 Tread portion, 3 Side wall portion, 4 Bead portion, 5 Bead core, 6 Carcass, 7 Belt layer, 8 Bead apex rubber, 9 Inner liner rubber, 3G Side wall rubber, 4G Clinch apex rubber

BEST MODES FOR CARRYING OUT THE INVENTION

The rubber composition for tires according to the present invention contains a rubber component containing a natural rubber component consisting of at least either a natural rubber (NR) or an epoxidized natural rubber (ENR) and an inorganic filler containing at least silica. The rubber composition for tires according to the present invention is preferably used as a rubber composition for clinch apex and as a rubber composition for bead apex. The following description will describe these rubber compositions in detail.

<Rubber Composition for Clinch Apex>.

The rubber composition for clinch apex according to the present invention uses a natural rubber component consisting of at least either of a natural rubber and an epoxidized natural rubber as its rubber component, and its compounding amount of carbon black is made smaller so that the amount of use of materials derived from petroleum resources can be reduced. Moreover, by using the rubber component and a small amount of carbon black, the processability upon preparation becomes superior. In the present invention, by using a rubber composition for clinch apex having the small compounding amount of carbon black, it becomes possible to reduce a heat generating property of a pneumatic tire. On the other hand, in the present invention, since the compounding amount of the inorganic filler is set within a predetermined range, a superior crack resistant characteristic can be obtained by the fillers except for carbon black. The present invention makes it possible to reduce the amount of use of materials derived from petroleum resources, and also to provide a rubber composition for clinch apex that has a low heat-generating characteristic and is superior in processability upon preparation.

(Rubber Components)

The natural rubber component to be used in the present invention consists of at least either of a natural rubber (NR) and an epoxidized natural rubber (ENR). That is, in the present invention, since no synthetic rubber derived from petroleum resources is used, it is possible to reduce the amount of use of materials derived from petroleum resources.

With respect to the natural rubber (NR), any of those conventionally used in the rubber industry may be used, and for example, natural rubbers of a grade such as RSS#3 and TSR may be used.

The epoxidized natural rubber (ENR) is one kind of modified natural rubbers, in which unsaturated double bonds of a natural rubber (NR) are epoxidized, and by the epoxy group that is a polar group, a molecule aggregating force is increased. For this reason, this has a glass transition temperature (Tg) higher than that of the natural rubber, and is superior in mechanical strength, abrasion resistance and air permeation resistance. In particular, in the case when silica is blended in the rubber composition, it becomes possible to provide mechanical strength and abrasion resistance as high as those of the composition in which carbon black is blended in a rubber composition, because of a reaction between a silanol group on the surface of silica and an epoxy group of the epoxidized natural rubber.

With respect to the epoxidized natural rubber (ENR), those commercially available may be used, or those formed by epoxidizing a natural rubber (NR) may be used. With respect to the method for epoxidizing the natural rubber (NR), not particularly limited, for example, a chlorohydrin method, a direct oxidizing method, a hydrogen peroxide method, an alkyl hydroperoxide method and a peroxide method may be used. With respect to the peroxide method, for example, a method may be used in which, for example, an emulsion of a natural rubber is allowed to react with an organic peroxy acid, such as acetic peroxy acid and formic peroxy acid, serving as an epoxidizing agent.

The epoxidation ratio of the epoxidized natural rubber (ENR) is preferably set to 5 mol % or more, more preferably, to 10 mol % or more. In the present specification, the epoxidation ratio refers to a ratio of the number of epoxidized double bonds among all the number of double bonds in a natural rubber prior to the epoxidization, and this ratio is found by using, for example, a titration analysis and a nuclear magnetic resonance (NMR) analysis. In the case when the epoxidation ratio in the epoxidized natural rubber (ENR) is less than 5 mol %, since the glass transition temperature is low and since the rubber hardness of the rubber composition for clinch apex is subsequently low, with the result that a pneumatic tire using the rubber composition for clinch apex as its clinch apex rubber tends to have degradation in the durability and fatigue resistant property. Moreover, the epoxidation ratio of the epoxidized natural rubber (ENR) is preferably set to 65 mol % or less, more preferably to 60 mol % or less. In the case when the epoxidation ratio of the epoxidized natural rubber (ENR) exceeds 65 mol %, the rubber composition for clinch apex tends to be hardened to cause a reduction in the mechanical strength.

With respect to the epoxidized natural rubber (ENR), typically, an epoxidized natural rubber having an epoxidation ratio of 25 mol %, or an epoxidized natural rubber having an epoxidation ratio of 50 mol %, may be used.

The content of a natural rubber (NR) in natural rubber components is preferably set to 10% by mass or more. In the case when the content of the natural rubber (NR) is less than 50% by mass, the mechanical strength of the rubber composition for clinch apex tends to be lowered. The content of the natural rubber (NR) is preferably set to 30% by mass or more, more preferably, to 40% by mass or more. Moreover, the content of the natural rubber (NR) of the natural rubber components is preferably set to 90% by mass or less. In the case when the content of the natural rubber (NR) exceeds 90% by mass, the tear strength of the rubber composition for clinch apex tends to be lowered. The content of the natural rubber (NR) is preferably set to 80% by mass or less.

The content of the epoxidized natural rubber (ENR) in natural rubber components is preferably set to 10% by mass or more, more preferably, to 20% by mass or more. In the case when the content of the epoxidized natural rubber (ENR) is less than 10% by mass, the tensile strength tends to become smaller. The content of the epoxidized natural rubber is preferably set to 20% by mass or more, more preferably, to 30% by mass or more. Moreover, the content of the epoxidized natural rubber (ENR) in natural rubber components is preferably set to 70% by mass or less. In the case when the content of the epoxidized natural rubber (ENR) exceeds 70% by mass, since the rubber hardness becomes too high, the mechanical strength of the rubber composition for clinch apex tends to be lowered. The content of the epoxidized natural rubber (ENR) is preferably set to 60% by mass or less.

(Inorganic Filler)

In the rubber composition for clinch apex according to the present invention, the inorganic filler is preferably blended in a range from 50 to 80 parts by mass relative to 100 parts by mass of rubber components. In the case when the compounding amount of the inorganic filler relative to 100 parts by mass of rubber components is less than 50 parts by mass, it is not possible to obtain a predetermined crack resistant characteristic, and when it exceeds 80 parts by mass, the processability deteriorates. The compounding amount of the inorganic filler is preferably set to 55 parts by mass or more, more preferably, to 60 parts by mass or more, and is also preferably set to 75 parts by mass or less, more preferably, to 70 parts by mass or less.

The inorganic filler is allowed to contain silica. Thus, since the amount of use of carbon black is reduced, with the mechanical strength of the rubber composition for clinch apex being desirably maintained, the amount of use of materials derived from petroleum resources can be reduced. Moreover, by using carbon black in combination with the inorganic filler, it becomes possible to prevent degradation in the processability that occurs when a large amount of silica is used.

The compounding amount of silica is preferably set in a range from 25 to 70 parts by mass relative to 100 parts by mass of rubber components. In the case when the compounding amount of silica is less than 25 parts by mass, the reinforcing effect to be exerted by the addition of silica tends to become smaller, while the compounding amount thereof exceeding 70 parts by mass tends to cause degradation in the processability. The compounding amount of silica is preferably set to 30 parts by mass or more, more preferably, to 35 parts by mass or more, and is also preferably set to 60 parts by mass or less, more preferably, to 55 parts by mass or less.

Moreover, when the inorganic filer contains a filler other than silica, the compounding amount of silica is preferably set in a range from 30 to 55 parts by mass relative to 100 parts by mass of rubber components. In the case when the compounding amount of silica is less than 30 parts by mass, the reinforcing effect to be exerted by the addition of silica tends to become smaller, while the compounding amount exceeding 55 parts by mass tends to cause degradation in the processability. The compounding amount of silica is preferably set to 35 parts by mass or more, more preferably, to 40 parts by mass or more, and is also preferably set to 50 parts by mass or less, more preferably, to 45 parts by mass or less.

The BET specific surface area of silica is preferably set to 100 $m^2/g$ or more, and in this case, it is possible to provide superior mechanical strength in the rubber composition for clinch apex. The BET specific surface area of silica is preferably set to 130 $m^2/g$ or more, more preferably, to 150 $m^2/g$ or more. Moreover, the BET specific surface area of silica is preferably set to 200 $m^2/g$ or less, and in this case, it is possible to provide superior processability. The BET specific surface area of silica is also preferably set to 190 $m^2/g$ or less, more preferably, to 180 $m^2/g$ or less.

Here, the BET specific surface area can be measured by using, for example, a method in accordance with ASTM-D-4820-93.

The silica may be prepared by using a wet method, or may be prepared by using a dry method. Preferable commercial products include, for example, "Ultrazil VN3" manufactured by Evonik Degussa Japan Co., Ltd.

With respect to a filler that can be added in addition to silica as an inorganic filler, examples thereof include calcium carbonate, aluminum hydroxide, clay, mica and magnesium oxide. In particular, the filler(s) other than silica among the inorganic fillers (hereinafter, referred to simply as another filler or other fillers) preferably consists of at least one material selected from the group consisting of calcium carbonate, aluminum hydroxide, clay, mica and magnesium oxide.

That is, the inorganic filler consists of at least one material selected from the group consisting of calcium carbonate, aluminum hydroxide, clay, mica and magnesium oxide, and silica. In this case, since any of calcium carbonate, aluminum hydroxide, clay, mica, magnesium oxide and silica are materials other than those materials derived from petroleum resources, it becomes possible to desirably obtain the reducing effect of the amount of use of materials derived from petroleum resources, with superior mechanical strength being maintained.

Here, the clay to be used for the rubber composition for clinch apex according to the present invention is a general term for an aggregate of fine particles derived from rocks or minerals that have been eroded or subjected to a methamorphic action, and typically refers to particles mainly composed of clay minerals having a particle size of 2 μm. Here, the clay minerals typically mean crystalline or amorphous materials mainly composed of layer-state silicates.

Specific examples of the clay include wet kaolin (uncalcined kaolin), calcined kaolin, and wet or dried agalmatolite clay, and clay whose surface has been subjected to a treatment by a coupling agent may also be used. Among them, from the viewpoint of superior dispersing property in rubber, the clay the surface of which has been subjected to a treatment by a coupling agent is desirably used.

Among the inorganic fillers of the present invention, the sum of compounding amounts of the other fillers is preferably set to 20 parts by mass or more relative to 100 parts by mass of rubber components. In the case when the sum of compounding amounts of the other fillers is less than 20 parts by mass, since the compounding amount of silica becomes too much, the processability tends to be lowered. The sum of the compounding amounts is more preferably set to 22 parts by mass or more, more preferably, to 25 parts by mass or more. In contrast, in the case when the sum of compounding amounts thereof exceeds 50 parts by mass, since the compounding amount of silica becomes smaller, the reinforcing effect tends to be lowered; therefore, the sum of compounding amounts thereof is preferably set to 50 parts by mass or less, more preferably, to 40 parts by mass or less, most preferably, to 30 parts by mass or less.

Moreover, the compounding amount of calcium carbonate is preferably set to 20 to 40 parts by mass relative to 100 parts by mass of rubber components. In the case when the compounding amount of calcium carbonate is less than 20 parts by mass, since the compounding amount of silica is increased, the processability tends to be lowered; in contrast, in the case when the compounding amount thereof exceeding 40 parts by mass, since the compounding amount of silica is decreased, the reinforcing effect tends to be lowered. The compounding amount of calcium carbonate is preferably set to 25 parts by mass or more, and is also preferably set to 35 parts by mass or less.

Here, the inorganic filler may consist of silica. In this case also, since silica that is a material other than those materials derived from petroleum resources is used, it becomes possible to obtain the reducing effect of the amount of use of materials derived from petroleum sources, with desirable mechanical strength being maintained.

(Carbon Black)

The rubber composition for clinch apex according to the present invention preferably contains carbon black. The compounding amount of carbon black is preferably set in a range from 2 to 5 parts by mass relative to 100 parts by mass of rubber components. In the case when the compounding amount of carbon black relative to 100 parts by mass of rubber components is less than 2 parts by mass, the crack resistant characteristic and processability deteriorate; in contrast, in the case when the compounding amount thereof exceeds 5 parts by mass, the reducing effect of the amount of use for materials derived from petroleum resources tends to be lowered, and it becomes difficult to provide the low heat generating property. The compounding amount of carbon black is preferably set to 3 parts by mass or more, and is also preferably set to 4 parts by mass or less.

The iodine adsorption specific surface area of carbon black is preferably set to 30 g/kg or more, and in this case, it is possible to provide superior mechanical strength in the rubber composition for clinch apex. The iodine adsorption specific surface area of carbon black is more preferably set to 40 g/kg or more, most preferably, to 70 g/kg or more. Moreover, the iodine adsorption specific surface area of carbon black is preferably set to 150 g/kg or less, and in this case, it is possible to provide superior processability. The iodine adsorption specific surface area of carbon black is more preferably set to 130 g/kg or less, most preferably, to 125 g/kg or less.

For example, "Diablack H" manufactured by Mitsubishi Chemical Industries, Ltd. is proposed as one of preferable commercial products for carbon black.

(Silane Coupling Agent)

In the present invention, silica is blended. Therefore, in the case when a silane coupling agent is used in combination, a superior reinforcing effect is desirably exerted on a rubber composition for clinch apex. The compounding amount of the silane coupling agent is preferably set in a range from 4 to 12% by mass relative to 100% by mass of the compounding amount of silica. In the case when the compounding amount of the silane coupling agent is less than 4% by mass, the reinforcing effect tends to be lowered, while in the case when it exceeds 12% by mass, even if the amount is increased, it is not possible to expect remarkable improvements in the reinforcing effect, and a problem tends to arise in that the product is not economical due to an increase in the costs. The compounding amount of the coupling agent is preferably set to 6% by mass or more, more preferably, to 8% by mass or more.

Conventionally known silane coupling agents may be used as the silane coupling agent, and examples thereof include: sulfide-based coupling agents, such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilyipropylbenzothiazolyitetrasulfide, 3-triethoxysilylpropylbenzothiazoletetrasulfide, and 3-trimethoxysilylpropylmethacrylatemonosulfide; mercapto-based coupling agents, such as 3-mercaptopropyltrimethoxysilane, 3-mercaptopropyltriethoxysilane, 2-mercaptoethyltrimethoxysilane and 2-mercaptoethyltriethoxysilane; vinyl-based coupling agents, such as vinyltriethoxysilane and vinyltrimethoxysilane; amino-based coupling agents, such as 3-aminopropyltriethoxy silane, 3-aminopropyltrimethoxy silane, 3-(2-aminoethyl) aminopropyltriethoxysilane and 3-(2-aminoethyl)aminopropyltrimethoxysilane; glcidoxy-based coupling agents, such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro-based coupling agents, such as 3-nitropropyltrimethoxysilane and 3-nitropropyltriethoxysilane; and chloro-based coupling agents, such as 3-chloropropyltrimethoxysilane, 3-chloropropyltriethoxysilane, 2-chloroethyltrimethoxysilane and 2-chloroethyltriethoxysilane. With respect to these silane coupling agents, one of these may be used alone, or two or more kinds of these may be used in combination.

Among the above-mentioned agents, from the viewpoint of good processability, Si69 (bis(3-triethoxysilylpropyl)tetrasulfide), Si266 (bis(3-triethoxysilylpropyl)disulfide) and the like, manufactured by Evonik Degussa Japan Co., Ltd. are preferably used.

(Other Compounding Agents)

In addition to the above-mentioned components, other compounding agents conventionally used in the rubber industry, such as a vulcanizing agent, stearic acid, a vulcanizing accelerator, a vulcanizing accelerator auxiliary agent (for example, zinc oxide), oil, curable resin, wax and an antioxidant, may be blended in the rubber composition for clinch apex of the present invention. Moreover, as a filler other than the above-mentioned silica and carbon black, for example, titanium oxide, magnesium oxide, calcium carbonate, magnesium carbonate, aluminum hydroxide, magnesium hydroxide, clay, talc and the like may be used in combination.

With respect to the vulcanizing agent, an organic peroxide or a sulfur-based vulcanizing agent may be used, and examples of the organic peroxide include: benzoyl peroxide, dicumyl peroxide, di-t-butyl peroxide, t-butyl cumyl peroxide, methylethyl ketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexene, 3 or 1,3-bis(t-butylperoxypropyl)benzene, di-t-butylperoxy-diisopropylbenzene, t-butylperoxybenzene, 2,4-dichlorobenzyolperoxide, 1,1-di-t-butylperoxy-3,3,5-trimethylsiloxane, and n-butyl-4,4-di-t-butylperoxyvalerate. Among them, dicumyl peroxide, t-butyl peroxy benzene and di-t-butyl peroxy-diisopropyl benzene are preferably used. With respect to the sulfur-based vulcanizing agent, examples thereof include sulfur and morpholine sulfide. Of these, sulfur is more preferably used. One of these vulcanizing agents may be used alone, or two or more kinds of these may be used in combination. Moreover, sulfur that has been subjected to an oil treatment may be used.

With respect to the vulcanizing accelerator, an accelerator containing at least one of sulphenamide-based, thiazole-based, thiuram-based, thiourea-based, guanidine-based, dithiocarbanic acid-based, aldehyde-amine-based or aldehyde-ammonia-based, and imidazoline-based or xantate-based vulcanizing accelerators, may be used. With respect to the sulphenamide-based vulcanizing accelerator, for example, sulphenamide-based compounds, such as CBS (N-cyclohexyl-2-benzothiazyl sulphenamide), TBBS (N-tert-butyl-2-benzothiazyl sulphenamide), N,N-dicyclohexyl-2-benzothiazyl sulphenamide, N-oxydiethylene-2-benzothiazyl sulphenamide, N,N-diisopropyl-2-benzothiazole sulphenamide, may be used. With respect to the thiazole-based vulcanizing accelerator, for example, thiazole-based compounds, such as MBT (2-mercaptobenzothiazole), MBTS (dizenzothiazyl sulfide), sodium salt, zinc salt, cupper salt and cyclohexyl amine salt of 2-mercaptobenzothiazole, 2-(2,4-dinitrophenyl)mercaptobenzothiazole, and 2-(2,6-diethyl-4-morpholinothio)benzothiazole, may be used. With respect to the thiuram-based vulcanizing accelerator, thiuram-based compounds, such as TMTD (tetramethylthiuram disulfide), tetraethylthiuram disulfide, tetramethylthiuram monosulfide, dipentamethylenethiuram disulfide, dipentamethylene monosulfide, dipentamethylenethiuram tetrasulfide, dipentamethylenethiuram hexasulfide, tetrabutylthiuram disulfide and pentamethylenethiuram tetrasulfide, may be used. With respect to the thiourea-based vulcanizing accelerator, for example, thiourea compounds, such as thiacarbamide, diethyl thiourea, dibutyl thiourea, trimethyl thiourea and diorthotolyl thiourea, may be used. With respect to the guanidine-based vulcanizing accelerator, for example, guanidine-based compounds, such as diphenyl guanidine, diorthotolyl guanidine, triphenyl guanidine, orthotolyl guanidine and diphenylguanidine phthalate, may be used. With respect to the dithiocarbanic acid-based vulcanizing accelerator, for example, dithiocarbanic acid-based compounds, such as zinc ethylphenyl dithiocarbamate, zinc butylphenyl dithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, complex salts of zinc pentamethylene dithiocarbamate and piperidine, zinc hexadecyl (or octadecyl)isopropyl dithiocarbamate, zinc dibenzyl dithiocarbamate, sodium diethyldithiocarbamate, pentamethylene dithiocarbamic acid piperidine, selenium dimethyldithiocarbamate, tellurium diethyldithiocarbamate and cadmium diamyldithiocarbamate, may be used. With respect to the aldehyde-amine based or aldehyde-ammonia based vulcanizing accelerator, for example, aldehyde-amine based or aldehyde ammonia based compounds, such as acetaldehyde-aniline reactants, butylaldehyde-aniline condensation products, hexamethylene tetramine and acetaldehyde-ammonia reactants. With respect to the imidazoline-based vulcanizing accelerator, for example, imidazoline-based compounds such as 2-mercaptoimidazoline may be used. With respect to the xantate-based vulcanizing accelerator, for example, xantate-based compounds such as zinc dibutylxanthogenate may be used. One of these vulcanizing accelerator may be used alone, or two or more kinds of these may be used in combination.

With respect to the antioxidant, an appropriate one may be selected from amine-based, phenol-based and imidazole-based antioxidants and metallic salts of carbamate, and used.

With respect to the oil, process oil, vegetable oil, or a mixture of these may be used. Examples of the process oil include: paraffin-based process oil, naphthene-based process oil and aromatic-based process oil. Examples of the vegetable oil include: castor oil, cotton seed oil, linseed oil, rapeseed oil, soybean oil, palm oil, coconut oil, peanut oil, rosin oil, pine oil, pine tar, tall oil, corn oil, rice oil, safflower oil, sesame oil, olive oil, sunflower oil, palm kernel oil, tsubaki oil, jojoba oil, macadamia nut oil, safflower oil and paulownia oil.

The rubber hardness (that is, JIS-A hardness) of the rubber composition for clinch apex according to the present invention after the crosslinking process to be measured by a hardness testing method (JIS K6253) is preferably set in a range from 60 to 80. The rubber hardness of less than 60 tends to cause a reduction in the rigidity of the rubber composition for clinch apex and the subsequent reduction in durability of a pneumatic tire. Moreover, the rubber hardness exceeding 80 tends to make the rubber composition for clinch apex harder to cause a reduction in the mechanical strength.

The rubber hardness is preferably set to 65 or more, more preferably, to 75 or more.

<Rubber Composition for Bead Apex>

The rubber composition for bead apex according to the present invention contains rubber components and silica serving as an inorganic filler, and preferably further contains clay serving as an inorganic filler. That is, by using silica and clay that are derived from materials other than petroleum resources, it is possible to reduce the amount of use of materials derived from petroleum resources. Moreover, a pneumatic tire in which a rubber composition for bead apex containing silica and clay is used is free from heat generation, which makes this pneumatic tire different from a pneumatic tire in which a rubber composition for bead apex containing, for example, a large amount of carbon black is blended. Moreover, in the present invention, by blending clay therein, it is possible to obtain a rubber having superior mechanical strength without causing degradation in processability upon preparation of the rubber composition. In accordance with the present invention, it becomes possible to provide a rubber composition for bead apex that reduces the amount of use of materials derived from petroleum resources, has high rigidity and a low heat generating characteristic, and is superior in processability upon preparation.

(Rubber Components)

The rubber components to be used in the present invention contain a natural rubber component consisting of at least either one of a natural rubber and an epoxidized natural rubber.

With respect to the natural rubber (NR), any of those conventionally used in the rubber industry may be used, and for example, natural rubbers of a grade such as RSS#3 and TSR may be used.

The epoxidation ratio of the epoxidized natural rubber (ENR) is preferably set to 10 mol % or more, more preferably, to 20 mol % or more. In the case when the epoxidation ratio of the epoxidized natural rubber (ENR) is less than 10 mol %, since the glass transition temperature of the epoxidized natural rubber (ENR) becomes low, the rubber hardness of the rubber composition for bead apex is low, with the result that a pneumatic tire which uses the rubber composition for bead apex as its bead apex rubber tends to have a reduction in the durability and fatigue resistance. Moreover, the epoxidation ratio of the epoxidized natural rubber (ENR) is preferably set to 70 mol % or less, more preferably, to 60 mol % or less. In the case when the epoxidation ratio of the epoxidized natural rubber (ENR) exceeds 70 mol %, the rubber composition for bead apex tends to become harder to cause a reduction in the mechanical strength.

With respect to the epoxidized natural rubber (ENR), typically, epoxidized natural rubbers having an epoxidation ratio of 25 mol % and epoxidized natural rubbers having an epoxidation ratio of 50 mol % are exemplified.

In the present invention, the content of natural rubber components in the rubber components is preferably set to 70% by mass. In the case when the content is less than 70% by mass, the reducing effect of the amount of use for materials derived from petroleum resources tends to be lowered. The content of natural rubber components is preferably set to 80% by mass or more, more preferably, to 90% by mass or more.

From the viewpoint of superior reducing effect of the amount of use for materials derived from petroleum resources, the content of natural rubber components in the rubber components is most preferably set to 100% by mass, that is, the rubber components most preferably consist of natural rubber components. However, depending on desired tire characteristics, the content of natural rubber components in the rubber components may be set to 90% by mass or less, further, to 80% by mass or less, with rubber components other than the natural rubber components being blended as the remaining portion of the rubber components.

In addition to the natural rubber components as defined above, the rubber components may contain a modified natural rubber or the like, such as a hydrogenated natural rubber, as a rubber derived from materials other than petroleum resources.

Moreover, the rubber components may contain rubbers derived from petroleum resources, in such a range as not to impair the effects of the present invention.

Examples of the rubbers derived from petroleum resources include: styrene butadiene rubber (SBR), butadiene rubber (BR), styrene-isoprene copolymer rubber, isoprene rubber (IR), butyl rubber (IIR), chloroprene rubber (CR), acrylonitrile butadiene rubber (NBR), halogenated butyl rubber (X-IIR) and a halogenide of a copolymer of isobutylene and p-methylstyrene. Among them, from the viewpoints of providing a high hardness in the rubber composition for bead apex and of imparting particularly good durability and fatigue resistant property to a pneumatic tire, SBR, BR and IR are preferably used.

The content of natural rubbers (NR) in the rubber components is preferably set to 70% by mass or more. In the case when the content of natural rubbers (NR) is less than 70% by mass, the reducing effect of the amount of use for materials derived from petroleum resources tends to be lowered. The content of natural rubber components (NR) is preferably set to 80% by mass or more, more preferably, to 90% by mass or more. The content of natural rubber components (NR) may be set to 100% by mass; alternatively, depending on desired tire characteristics, the content of natural rubber components in the rubber components may be set to 90% by mass or less, further, to 80% by mass or less, with the rest of the rubber components being formed by epoxidized natural rubber, or another modified natural rubber, or synthesized rubber and the like.

The content of the epoxidized natural rubber (ENR) in rubber components is preferably set to 5% by mass or more. In the case when the content of the epoxidized natural rubber is less than 5% by mass, the rigidity of the rubber composition for bead apex tends to be lowered. The content of the epoxidized natural rubber (ENR) is preferably set to 10% by mass or more, more preferably, to 15% by mass or more. Moreover, the content of the epoxidized natural rubber (ENR) in rubber components is preferably set to 80% by mass or less. In the case when the content of the epoxidized natural rubber (ENR) exceeds 80% by mass, the rubber hardness and rigidity become too high, with the result that the mechanical strength of the rubber composition for bead apex tends to be lowered on the contrary. The content of the epoxidized natural rubber (ENR) is preferably set to 70% by mass or less, more preferably, to 60% by mass or less.

(Clay)

The Rubber Composition for Bead Apex of the Present Invention Preferably contains clay as an inorganic filler. Here, the clay to be used for the rubber composition for bead apex according to the present invention is a general term for an aggregate of fine particles derived from rocks or minerals that have been eroded or subjected to a methamorphic action, and typically refers to particles mainly composed of clay minerals having a particle size of 10 μM. Here, the clay minerals typically mean crystalline or amorphous materials mainly composed of layer-state silicates.

Specific examples of the clay include wet kaolin (uncalcined kaolin), calcined kaolin, and wet or dried agalmatolite clay. Among them, calcined kaolin is preferably used because it is highly effective to impart a low heat generating property to a tire during driving.

The compounding amount of the clay relative to 100 parts by mass of the rubber component is preferably set within a range from 5 to 40 parts by mass. In the case when the compounding amount of the clay is less than 5 parts by mass, it is not possible to sufficiently obtain the reinforcing effect and the improving effect in processability; in contrast, the compounding amount exceeding 40 parts by mass tends to cause a decrease in the mechanical strength of a rubber composition for bead apex, and the subsequent reduction in durability of the bead apex rubber. The compounding amount of the clay is preferably set to 5 parts by mass or more, more preferably, to 10 parts by mass or more, and is also preferably set to 40 parts by mass or less, more preferably, to 30 parts by mass or less.

The average particle size of the clay is preferably set in a range from 0.3 to 5 μm. In the case when the average particle size of the clay is less than 0.3 μm, the processability tends to be lowered; in contrast, when it exceeds 5 μm, the hardness of the rubber composition for bead apex tends to be lowered to make the mechanical strength smaller. The average particle size of the clay is preferably set to 0.4 μm or more, more preferably, to 0.5 μm or more, and is also preferably set to 4 μm or less, more preferably, to 3 μm or less.

With respect to preferable commercial products of the clay, examples thereof include such as: "Union Clay RC-1", "Glomax LL", "NN Kaoline Clay" and "No. 5 Clay" manufactured by Takehara Kagaku Kogyo Co., Ltd., "KAOKAL" manufactured by Thiele Kaolin Company and "Huber 35 (B)" manufactured by J.M. Huber Corporation.

(Silica)

Silica is blended so that the total of the compounding amounts of silica and clay is set to 65 parts by mass or more relative to 100 parts by mass of rubber components. In the case when the total of the compounding amounts of silica and clay is less than 65 parts by mass, the reinforcing effect is not obtained sufficiently. The total of the compounding amounts of silica and clay is preferably set to 70 parts by mass or more.

From the viewpoint of sufficiently obtaining the reinforcing effect, the greater the total of the compounding amounts of silica and clay, the better the effect; however, when the total becomes too high, the rubber composition for bead apex tends to become harder to cause a reduction in the mechanical strength. Therefore, the total of the compounding amounts of silica and clay is set to 100 parts by mass or less, preferably, to 90 parts by mass or less, more preferably, to 85 parts by mass or less, relative to 100 parts by mass of the rubber components.

The compounding amount of silica relative to 100 parts by mass of rubber components is preferably set in a range from 20 to 70 parts by mass. In the case when the compounding amount of silica is less than 20 parts by mass, the reinforcing effect to be obtained by blending silica tends to be lowered, while in the case when it exceeds 70 parts by mass, the rubber composition for bead apex is hardened, with the result that the mechanical strength tends to be lowered. The compounding amount of silica is preferably set to 25 parts by mass or more, more preferably, to 30 parts by mass or more, and is also preferably set to 65 parts by mass or less, more preferably, to 60 parts by mass or less.

The BET specific surface area of silica is preferably set in a range from 100 to 300 $m^2/g$. In the case when the BET specific surface area of silica is less than 100 $m^2/g$, the hardness of the rubber composition for bead apex is lowered, with the result that the mechanical strength tends to be lowered; in contrast, when it exceeds 300 $m^2/g$, the processability tends to be lowered. The BET specific surface area of silica is preferably set to 110 $m^2/g$ or more, more preferably, to 120 $m^2/g$ or more, and is also preferably set to 280 $m^2/g$ or less, more preferably, to 260 $m^2/g$ or less.

Here, the BET specific surface area can be measured by using, for example, a method in accordance with ASTM-D-4820-93.

The silica may be prepared by using a wet method, or may be prepared by using a dry method. Preferable commercial products include, for example, "Ultrazil VN2" (BET specific surface area: 125 $m^2/g$) and "Ultrazil VN3" (BET specific surface area: 175 $m^2/g$) manufactured by Evonik Degussa Japan Co., Ltd.

(Carbon Black)

In the rubber composition for bead apex of the present invention, the inorganic filler may further include carbon black. In this case, the compounding amount of carbon black relative to 100 parts by mass of rubber components is preferably set to 5 parts by mass or less. In the case when the compounding amount of carbon black exceeds 5 parts by mass, the reducing effect of the amount of use for materials derived from petroleum resources tends to be lowered, and the low heat generating property tends to be unobtainable. From the viewpoint of reducing the amount of use for materials derived from petroleum resources, the compounding amount of carbon black is preferably set to 4.5 parts by mass or less, more preferably, to 4 parts by mass or less. In contrast, from the viewpoint of improving the reinforcing effect for the rubber composition for bead apex, the compounding amount of carbon black may be set to 1 part by mass or more, preferably, to 2 parts by mass or more, more preferably, to 2.5 parts by mass or more.

The BET specific surface area of carbon black is preferably set in a range from 40 to 300 $m^2/g$. In the case when the BET specific surface area of carbon black is less than 40 $m^2/g$, the mechanical strength of the rubber composition for bead apex tends to be lowered. The BET specific surface area of carbon black is preferably set to 50 $m^2/g$ or more, more preferably, to 60 $m^2/g$ or more. In contrast, in the case when the BET specific surface area of carbon black exceeds 300 $m^2/g$, the processability upon preparation of the rubber composition for bead apex tends to be lowered. The BET specific surface area of carbon black is preferably set to 280 $m^2/g$ or less, more preferably, to 260 $m^2/g$ or less.

With respect to desirable commercial products for carbon black, examples thereof include "Showblack N330", "Showblack N220", "Showblack N110" and the like, manufactured by Cabonet Japan K.K.

(Other Inorganic Fillers)

In addition to the above-mentioned clay, silica and carbon black, the inorganic filler may contain, for example, titanium oxide, magnesium oxide, calcium carbonate, magnesium carbonate, aluminum hydroxide, magnesium hydroxide, clay, talc and the like. Here, typically, an inorganic filler consisting of clay and silica, or an inorganic filler consisting of clay, silica and carbon black is blended therein.

The compounding amount of the inorganic filler is preferably set to 60 parts by mass or more relative to 100 parts by mass of rubber components. In the case when the compounding amount of the inorganic filler is less than 60 parts by mass, the reinforcing effect tends to be lowered. The compounding amount of the inorganic filler is preferably set to 65 parts by mass or more, more preferably, to 70 parts by mass or more. In contrast, from the viewpoints of preventing a reduction in mechanical strength due to excessively high rigidity of the rubber composition for bead apex and of desirably maintaining the processability upon preparation of the rubber composition for bead apex, the compounding amount of the inorganic filler is preferably set to 100 parts by mass or less, more preferably, to 90 parts by mass or less, most preferably, to 80 parts by mass or less.

(Silane Coupling Agent)

In the present invention, silica is blended. Therefore, in the case when a silane coupling agent is used in combination, a superior reinforcing effect is desirably exerted on a rubber composition for bead apex. The compounding amount of the silane coupling agent is preferably set in a range from 2 to 12% by mass relative to 100% by mass of the compounding amount of silica. In the case when the compounding amount of the silane coupling agent is less than 2% by mass, the reinforcing effect tends to be lowered, while in the case when it exceeds 12% by mass, even if the amount is increased, it is not possible to expect remarkable improvements in the reinforcing effect, and a problem tends to arise in that the product is not economical due to an increase in the costs. The compounding amount of the silane coupling agent is preferably set to 3% by mass or more, more preferably, to 4% by mass or more, and is also preferably set to 11% by mass or less, more preferably, to 10% by mass or less.

The specific examples of the silane coupling agent are the same as those described earlier. Among them, from the viewpoint of good processability, Si69 (bis(3-triethoxysilylpropyl)tetrasulfide), Si266 (bis(3-triethoxysilylpropyl)disulfide) and the like, manufactured by Evonik Degussa Japan Co., Ltd. are preferably used.

(Other Compounding Agents)

To the rubber composition for bead apex of the present invention, other compounding agents conventionally used in the rubber industry, such as a vulcanizing agent, stearic acid, a vulcanizing accelerator, a vulcanizing accelerator auxiliary agent (for example, zinc oxide), oil, curable resin, wax and an antioxidant, may be added, in the same manner as in the rubber composition for clinch apex.

The durometer hardness, which is a rubber hardness measured in accordance with JIS K6253 after the crosslinking process of the rubber composition for bead apex, is preferably set in a range from 70 to 95. The durometer hardness of less than 70 tends to cause a reduction in the rigidity of the rubber composition for bead apex and the subsequent reduction in durability of a pneumatic tire. Moreover, the durometer hardness exceeding 95 tends to make the rubber composition for bead apex harder to cause a reduction in the mechanical strength. The durometer hardness is preferably set to 78 or more, more preferably, to 80 or more, and is also preferably set to 92 or less, more preferably, to 90 or less.

Here, upon measuring the durometer hardness, the measuring range of a type-A durometer hardness is set to 10 to 90, and when the type-A durometer hardness exceeds 90, a type-D durometer is used for measurements, and the type-D durometer hardness is less than 20, a type-A durometer is used for measurements.

The following description will describe a pneumatic tire of the present invention. FIG. 1 is a cross-sectional view that shows a left half-portion of a pneumatic tire in accordance with the present invention.

A pneumatic tire 1, shown in FIG. 1, is provided with a tread portion 2, a pair of sidewall portions 3 that extend inward in a tire radial direction from the two ends of tread portion 2 and a bead portion 4 placed inner edge of each of side wall portions 3. A carcass 6 is bridged between these bead portions 4, and a belt layer 7 that has a hoop effect to reinforce tread portion 2 is placed on the outside of carcass 6 as well as on the inside of tread portion 2.

This carcass 6 is made of one or more sheets of carcass plies each having carcass cords arranged, for example, with an angle of 70 to 90°, relative to tire equator CO, and these carcass plies are passed from tread portion 2 to reach bead portion 4 through each side wall portion 3, and turned up around bead core 5 of bead portion 4 from inside to outside, and then engaged and stopped.

Belt layer 7 is constituted by two or more belt plies having belt cords arranged with, for example, an angle of 40° or less relative to tire equator CO, and the respective belt cords are superposed on one another in respectively different directions so as to intersect with one another between the plies. Here, if necessary, a band layer (not shown) that is used to prevent lifting of the two end portions of belt layer 7 may be placed at least on the outside of belt layer 7, and in this case, the band layer is prepared as continuous plies that are formed by helically winding organic fiber cords with a low modulus virtually in parallel with tire equator CO.

Moreover, in bead portion 4, a bead apex rubber 8 that extends outward from bead core 5 in a radial direction is disposed, and on the inside of carcass 6, an inner liner rubber 9 that forms the tire inner void face is placed adjacent thereto, and the outside of carcass 6 is protected by a clinch apex rubber 4G and a side wall rubber 3G.

In the pneumatic tire according to the present invention, either one of the clinch apex rubber and the bead apex rubber or both of the rubbers may be formed by using the rubber composition according to the present invention. Preferably, both of the clinch apex rubber and the bead apex rubber are composed of the rubber composition according to the present invention.

Here, FIG. 1 has exemplified a pneumatic tire for a passenger car; however, the present invention is not intended to be limited by this, and provides a pneumatic tire that can be used for applications for various vehicles, such as passenger cars, trucks, buses and heavy vehicles.

The pneumatic tire according to the present invention can be produced by using a conventionally known method. That is, for example, in the case when the rubber composition for clinch apex according to the present invention is used, a rubber composition for clinch apex containing the above-mentioned components is kneaded, and extrusion-processed into a shape of a clinch of a tire in an unvulcanized state, and then molded on a tire molding machine by using a normal method together with other members of the tire so that an unvulcanized tire is formed. By heating this unvulcanized tire in a curing machine, while applying a pressure thereto, a pneumatic tire according to the present invention is obtained. Also, in the case when the rubber composition for bead apex according to the present invention is used, the same processes can be carried out.

The pneumatic tire according to the present invention makes it possible to reduce the amount of use for materials derived from petroleum resources, is formed by sufficiently taking into consideration energy conservation and environmental protection, and has superior characteristics. More specifically, in the case when the rubber composition for clinch apex according to the present invention in which the crack resistant property, the low heat generating property and the processability upon preparation are simultaneously achieved effectively is used, it is possible to obtain a tire that is superior in durability and fuel cost. Moreover, in the case when the rubber composition for bead apex according to the present invention is used, it is possible to obtain a tire that is superior in steering stability and fuel cost, and is also superior in processability upon production. Therefore, the resulting tire can be desirably used for various applications, such as passenger cars, trucks, buses and heavy vehicles, as a so-called "ecological tire" that is friendly to the earth environment.

The following description will describe the present invention in detail by means of Examples and Comparative Examples; however, the present invention is not intended to be limited by these.

EXAMPLES 1 TO 11 AND COMPARATIVE EXAMPLES 1 TO 5

Among compounding components shown in Tables 1 to 3, the compounding components except for sulfur and the vulcanizing accelerator were kneaded at about 150° C. for 5 minutes by using a Banbary mixer. To the resulting mixture were further added sulfur and a vulcanizing accelerator in accordance with the compounding amounts shown in Table 1, and this was then kneaded at 80° C. for 5 minutes by using biaxial open rolls so that an unvulcanized rubber composition (rubber composition for clinch apex) was extruded to prepare an unvulcanized rubber sheet. Moreover, the resulting unvulcanized rubber sheet was cured at 170° C. for 12 minutes so that a testing rubber sheet was produced.

Moreover, the unvulcanized rubber sheet thus obtained was formed into a clinch apex portion, and this was molded on a tire molding machine together with other tire members by using a normal method so that an unvulcanized tire was formed. This unvulcanized tire was heated at 170° C. for 15 minutes in a curing machine so that a testing tire was obtained.

Here, the above-mentioned testing tire had the following basic structure:

| Carcass ply | |
|---|---|
| Cord angle | 90 degrees in the tire circumferential direction |
| Cord material | Polyester 1500 denier/2 |

| Breaker | |
|---|---|
| Cord angle | 24 degrees × 24 degrees in the tire circumferential direction |
| Cord material | 1 × 3 × 0.27 |

(Mooney viscosity ML (1 + 4)(130° C.))

The above-mentioned unvulcanized rubber composition was subjected to measurements on Mooney viscosity (ML (1+4)) at 130° C. in accordance with JIS K6251. As the numeric value becomes smaller, the viscosity becomes smaller, indicating that superior processability is obtained.
(tan δ)

The testing rubber sheet produced as described above was cut out to prepare a sample piece, and the sample piece was measured on tan δ under conditions of a temperature of 60° C., an initial strain of 10% and a dynamic strain of 2%, by using a viscoelastic spectrometer manufactured by IWA-MOTO Quartz GlassLab Co., Ltd. As the numeric value becomes smaller, the heat generating characteristic and rolling resistance becomes lower.
(Breaking Elongation EB)

The testing rubber sheet produced as described above was subjected to a tension test by using a No. 3 dumbbell in accordance with JIS K6251 so that the breaking elongation EB(%) was measured. As the numeric value becomes greater, the crack resistant characteristic becomes superior.
(Deformation and Crack Resistant Characteristic)

A testing tire, obtained as described above, was attached to a passenger vehicle of 2000 cc, and subjected to a driving test of about 5000 km. The deformation and cracks of the tire after the driving test were visually evaluated based upon the following criteria.

Deformation
A: No deformation was observed.
B: A partial deformation was observed.
C: A serious deformation was observed.

Cracks
A: No cracks were observed.
B: Cracks partially occurred.
C: A large number of cracks occurred.

TABLE 1

| | | Example 1 | Example 2 | Example 3 | Example 4 | Example 5 | Comparative Example 1 | Comparative Example 2 |
|---|---|---|---|---|---|---|---|---|
| Compounding ratio (Parts by mass) | Natural rubber (note 1) | 100 | 70 | 70 | 70 | 70 | 100 | 100 |
| | Epoxidized natural rubber (note 2) | — | 30 | 30 | 30 | 30 | — | — |
| | Butadiene rubber (note 3) | — | — | — | — | — | — | — |
| | Carbon black (note 4) | 5 | 5 | 5 | 5 | 5 | 10 | 5 |
| | Silica (note 5) | 70 | 70 | 50 | 50 | 55 | 70 | 45 |
| | Calcium carbonate (note 6) | — | — | 20 | — | 15 | — | — |
| | Hard clay (note 7) | — | — | — | 20 | — | — | — |
| | Silane coupling agent 1 (note 8) | 5.6 | 5.6 | 5.6 | 5.6 | 5.2 | 5.6 | 3.6 |
| | Silane coupling agent 2 (note 9) | — | — | — | — | — | — | — |
| | Process oil (note 10) | — | — | — | — | — | — | — |
| | Soya bean oil (note 11) | 10 | 10 | 10 | 10 | 10 | 10 | — |
| | Wax (note 12) | 1 | 1 | 1 | 1 | 1 | 1 | 1 |
| | Antioxidant (note 13) | 3 | 3 | 3 | 3 | 3 | 3 | 3 |
| | Stearic acid (note 14) | 1 | 1 | 1 | 1 | 1 | 1 | 1 |
| | Zinc white (note 15) | 3 | 3 | 3 | 3 | 3 | 3 | 3 |
| | Sulfur (note 16) | 1 | 1 | 1 | 1 | 1 | 1 | 1 |
| | Vulcanizing accelerator (note 17) | 3 | 3 | 3 | 3 | 3 | 3 | 3 |
| Evaluation | ML(1 + 4)(130° C.) | 85 | 82 | 75 | 74 | 77 | 94 | 76 |
| | tanδ | 0.14 | 0.135 | 0.122 | 0.137 | 0.130 | 0.170 | 0.105 |
| | Breaking elongation EB (%) | 430 | 450 | 410 | 400 | 430 | 405 | 530 |
| | External appearance after driving (deformed) | A | A | A | A | A | A | B |
| | External appearance after driving (with cracks) | A | A | A | A | A | A | B |

TABLE 2

| | | Example 6 | Example 7 | Example 8 | Example 9 | Example 10 | Example 11 |
|---|---|---|---|---|---|---|---|
| Compounding ratio (Parts by mass) | Natural rubber (note 1) | 100 | 100 | 100 | 100 | 100 | 100 |
| | Epoxidized natural rubber (note 2) | — | — | — | — | — | — |
| | Butadiene rubber (note 3) | — | — | — | — | — | — |
| | Carbon black (note 4) | 5 | 5 | 5 | 5 | 2 | 5 |
| | Silica (note 5) | 50 | 50 | 30 | 30 | 30 | 25 |
| | Calcium carbonate (note 6) | — | 30 | 50 | 50 | 50 | 50 |
| | Hard clay (note 7) | — | — | — | — | — | — |
| | Silane coupling agent 1 (note 8) | 4.0 | 6.4 | 6.4 | — | 6.4 | 6.0 |
| | Silane coupling agent 2 (note 9) | — | — | — | 6.4 | — | — |
| | Process oil (note 10) | — | — | — | — | — | — |
| | Soya bean oil (note 11) | — | 12 | 12 | 12 | 12 | 12 |
| | Wax (note 12) | 1 | 1 | 1 | 1 | 1 | 1 |
| | Antioxidant (note 13) | 3 | 3 | 3 | 3 | 3 | 3 |
| | Stearic acid (note 14) | 1 | 1 | 1 | 1 | 1 | 1 |
| | Zinc white (note 15) | 3 | 3 | 3 | 3 | 3 | 3 |
| | Sulfur (note 16) | 1 | 1 | 1 | 1 | 1 | 1 |
| | Vulcanizing accelerator (note 17) | 3 | 3 | 3 | 3 | 3 | 3 |
| Evaluation | ML(1 + 4)(130° C.) | 84 | 82 | 72 | 79 | 70 | 64 |
| | tanδ | 0.115 | 0.130 | 0.115 | 0.130 | 0.110 | 0.105 |
| | Breaking elongation EB (%) | 490 | 400 | 365 | 360 | 350 | 370 |
| | External appearance after driving (deformed) | B | A | A | A | A | A |
| | External appearance after driving (with cracks) | A | A | A | A | A | A |

TABLE 3

| | | Comparative Example 3 | Comparative Example 4 | Comparative Example 5 |
|---|---|---|---|---|
| Compounding ratio (Parts by mass) | Natural rubber (note 1) | 50 | 50 | 100 |
| | Epoxidized natural rubber (note 2) | — | — | — |
| | Butadiene rubber (note 3) | 50 | 50 | — |
| | Carbon black (note 4) | 65 | 5 | — |
| | Silica (note 5) | — | 75 | 30 |
| | Calcium carbonate (note 6) | — | — | 50 |
| | Hard clay (note 7) | — | — | — |
| | Silane coupling agent 1 (note 8) | — | 6.0 | 6.4 |
| | Silane coupling agent 2 (note 9) | — | — | — |

TABLE 3-continued

|  |  | Comparative Example 3 | Comparative Example 4 | Comparative Example 5 |
|---|---|---|---|---|
|  | Process oil[note 10] | 10 | — | — |
|  | Soya bean oil[note 11] | — | 10 | 12 |
|  | Wax[note 12] | 1 | 1 | 1 |
|  | Antioxidant[note 13] | 3 | 3 | 3 |
|  | Stearic acid[note 14] | 1 | 1 | 1 |
|  | Zinc white[note 15] | 3 | 3 | 3 |
|  | Sulfur[note 16] | 1 | 1 | 1 |
|  | Vulcanizing accelerator[note 17] | 3 | 3 | 3 |
| Evaluation | ML(1 + 4)(130° C.) | 80 | 95 | 66 |
|  | tan δ | 0.180 | 0.160 | 0.107 |
|  | Breaking elongation EB (%) | 340 | 390 | 325 |
|  | External appearance after driving (deformed) | A | A | A |
|  | External appearance after driving (with cracks) | A | A | B |

In Tables 1 to 3, notes 1 to 17 are explained as follows:

Note 1: Natural rubber is "RSS#3" manufactured by Teck Bee Hung

Note 2: Epoxidized natural rubber is "ENR 25" manufactured by MRB (Epoxidation ratio: 25 mol %).

Note 3: Butadiene rubber is "BR150B" manufactured by Ube Industries, Ltd.

Note 4: Carbon black is "Showblack N330" (iodine adsorption specific surface area: 70 mg/g) manufactured by Tokai Carbon Co., Ltd.

Note 5: Silica is "Ultrazil VN3" (BET specific surface area: 175 m$^2$/g) manufactured bymanufactured by Evonik Degussa Japan Co., Ltd.

Note 6: Calcium carbonate is "Success 200S" manufactured by Oumi Chemical Co., Ltd.

Note 7: Clay is "Burges KE" manufactured by Burgess Pigment Company

Note 8: Silane coupling agent 1 is "Si266", manufactured by Evonik Degussa Japan Co., Ltd.

Note 9: Silane coupling agent 2 is "KBE103", manufactured by Shin-Etsu Chemical Co., Ltd.

Note 10: Process oil is "PS32" manufactured by Idemitsu Kosan Co., Ltd.

Note 11: Soya bean oil is "Soybean Sirasimeyu" manufactured by Nissin Oillio Group, Ltd.

Note 12: Wax is "Sunnoc Wax" manufactured by OUCHI SHINKO CHEMICAL INDUSTRIAL CO., LTD.

Note 13: Antioxidant is "NOCRAC 6C" (N-(1,3-dimethylbutyl)-N'-phenyl-p-phenylene diamine), manufactured by OUCHI SHINKO CHEMICAL INDUSTRIAL CO., LTD.

Note 14: Stearic acid is "Stearic acid" manufactured by Nippon Oil & Fats Co., Ltd.

Note 15: Zinc white is "Zinc White No. 1" manufactured by Mitsui Mining & Smelting Co., Ltd.

Note 16: Sulfur is "Powdery Sulfur" manufactured by Turumi Chemicals Co., Ltd.

Note 17: Vulcanizing accelerator is "Nocceller CZ" manufactured by OUCHI SHINKO CHEMICAL INDUSTRIAL CO., LTD.

As shown in Tables 1 to 3, in Comparative Example 3 that used butadiene rubber with a high compounding amount of carbon black, the value of tan δ was great and the breaking elongation was small, and in Comparative Example 4 that used butadiene rubber with a low compounding amount of carbon black, the Mooney viscosity was high. Moreover, in Comparative Example 5 that used no carbon black, the value of breaking elongation was low. With respect to examples that used natural rubbers, in Comparative Example 1 having a high compounding amount of carbon black, the Mooney viscosity and tan δ were high, and in Comparative Example 2 having a small compounding amount of silica, the external appearance after the driving test became inferior.

In contrast, in Examples 1 to 11 that use a natural rubber and/or an epoxidized natural rubber, with a predetermined amount of carbon black and a predetermined amount of inorganic filler containing silica being contained in combination, the Mooney viscosity and tan δ were reduced, and the breaking elongation and the external appearance after the driving test were desirably maintained.

Therefore, it is found that, in accordance with the present invention, a rubber composition for clinch apex, which can reduce the amount of use of materials derived from petroleum sources, has a superior crack resistant characteristic and a low heat generating characteristic, and is superior in processability upon preparation, and a pneumatic tire using such a rubber composition can be provided.

EXAMPLES 12 TO 16 AND COMPARATIVE EXAMPLES 6 TO 10

(Preparation of Unvulcanized Rubber Sheet)

In accordance with respective compounding ratios shown in Table 4 and Table 5, compounding components except for sulfur and a vulcanizing accelerator were kneaded for 5 minutes at 150° C. by using a Banbary mixer of 1.7 L manufactured by Kobe Steel. Ltd. so that a kneaded material was obtained. To this were added sulfur and a vulcanizing accelerator in the compounding amounts shown in Table 4 and Table 5, and this was further kneaded at 80° C. for 5 minutes by using biaxial open rolls to prepare an unvulcanized rubber composition (rubber composition for bead apex), and this was extruded with a predetermined thickness so that an unvulcanized rubber sheet having a predetermined shape and unvulcanized rubber pieces were obtained.

(Preparation of Testing Rubber Sheet)

The unvulcanized rubber sheet having a predetermined shape and the unvulcanized rubber pieces obtained as described above were cured at 170° C. for 15 minutes so that a testing rubber sheet and testing rubber pieces were obtained.

(Preparation of Testing Tire)

The unvulcanized rubber sheet having a thickness of 10 mm, obtained by the above-mentioned method, was extruded into a bead apex shape, and molded on a tire molding machine by using a normal method together with other members of the tire so that an unvulcanized tire is formed. By heating this unvulcanized tire in a curing machine at 175° C. for 10 minutes while applying a pressure thereto, a pneumatic tire with a size of 195/60R15 having a structure as shown in FIG. 1 was produced as a testing tire.

(Mooney Viscosity Index)

The above-mentioned unvulcanized rubber composition was subjected to measurements on Mooney viscosity at 130° C. in accordance with JIS K6300, and supposing that the Mooney viscosity of Comparative Example 6 is 100, the Mooney viscosity index was found based upon the following equation:

Mooney viscosity index=(Mooney viscosity of each Example or Comparative Example)/(Mooney viscosity of Comparative Example 6)×100

Here, as the index becomes smaller, the Mooney viscosity becomes lower, indicating that superior processability is obtained.

(Rubber Hardness)

Three testing rubber sheets having a size of 150 mm×150 mm×2.0 mm, obtained by the above-mentioned method, were superposed on one another to prepare a sample, and the rubber hardness was measured on this sample in accordance with JIS K6253.

(Garvey Die Extrusion Characteristic)

The above-mentioned unvulcanized rubber composition was evaluated on the extrusion property by using a Laboplast Mill with a Garvey die set therein. The evaluation was carried out by classifying the surface states of the extruded matter into grades of A to E in accordance with a method of ASTM D2230-B.

(Extrusion Processability)

The extrusion processability was evaluated in accordance with the method of ASTM D2230-B, and when the edge of an extruded material was evaluated as 6 points or more in a point system of 1 to 10 points, with its surface state being evaluated as A or B in grades of A to E, this extruded material was evaluated as A, while the other extruded materials were evaluated as B.

(Complex Elastic Modulus (E*), Loss Tangent (tan δ))

The testing rubber piece having a size of 4.0 mm×2.0 mm×40 mm, obtained by the above-mentioned method, was subjected to measurements on E* and tan δ under conditions of a temperature of 70° C., an initial strain of 10% and a dynamic strain of 2%, by using a viscoelastic spectrometer manufactured by Iwamoto Seisakusho Co., Ltd.

(Tensile Strength (TB), Breaking Elongation (EB))

The testing rubber sheet of No. 3 dumbbell, obtained by the above-mentioned method, was subjected to measurements on the tensile strength (TB) and breaking elongation (EB) in accordance with HS K6251.

(Steering Stability)

The testing tire, obtained as described above, was attached to a Toyota Corolla, and this was subjected to an actual driving stability test on a tire test course. The steering stability was evaluated in the following manner: when a permissible response was obtained, this case was evaluated as A and when a response was impermissible, this case was evaluated as B.

(Durability)

The testing tire, obtained as described above, was subjected to a driving test of 30000 km on the test machine basis, and this was then disassembled, and the damaged state of the bead apex was visually observed. When no damages were observed in the bead apex, this case was evaluated as A, and when damages were observed, this case was evaluated as B.

TABLE 4

| | | Comparative Example 6 | Comparative Example 7 | Comparative Example 8 | Comparative Example 9 | Comparative Example 10 |
|---|---|---|---|---|---|---|
| Compounding ratio (Parts by mass) | Natural rubber [note 1] | 100 | 100 | 50 | 100 | 100 |
| | Epoxidized natural rubber [note 2] | — | — | 50 | — | — |
| | Carbon black [note 3] | 70 | 2 | 2 | 2 | 2 |
| | Silica [note 4] | — | 70 | 70 | 67 | 20 |
| | Clay [note 5] | — | — | — | 3 | 50 |
| | Silane coupling agent [note 6] | — | 5.6 | 5.6 | 5.6 | 5.6 |
| | Curable resin [note 7] | 12 | 12 | 12 | 12 | 12 |
| | Vegetable oil [note 8] | 3 | 3 | 3 | 3 | 3 |
| | Stearic acid [note 9] | 2 | 2 | 2 | 2 | 2 |
| | Zinc oxide [note 10] | 3 | 3 | 3 | 3 | 3 |
| | Sulfur [note 11] | 3.0 | 3.0 | 3.0 | 3.0 | 3.0 |
| | Vulcanizing accelerator [note 12] | 2.5 | 2.5 | 2.5 | 2.5 | 2.5 |
| Evaluation | Rubber hardness | 85 | 84 | 85 | 85 | 85 |
| | Mooney viscosity index | 100 | 150 | 145 | 145 | 85 |
| | Garvey die extrusion characteristic | A | C | C | C | A |
| | Extrusion processability | A | B | B | B | A |
| | E*(MPa) | 45 | 40 | 42 | 40 | 43 |
| | tan δ | 0.160 | 0.152 | 0.150 | 0.151 | 0.147 |
| | Tensile strength (TB) (MPa) | 16.0 | 15.5 | 15.8 | 15.2 | 14.0 |
| | Breaking elongation (EB) (%) | 200 | 220 | 230 | 220 | 180 |
| | Tire steering stability | A | A | A | A | A |
| | Tire durability | A | A | A | A | B |

TABLE 5

| | | Example 12 | Example 13 | Example 14 | Example 15 | Example 16 |
|---|---|---|---|---|---|---|
| Compounding ratio (Parts | Natural rubber [note 1] | 100 | 100 | 50 | 50 | 50 |
| | Epoxidized natural rubber [note 2] | — | — | 50 | 50 | 50 |
| | Carbon black [note 3] | 2 | 2 | 2 | 2 | 2 |
| | Silica [note 4] | 65 | 55 | 40 | 30 | 55 |

TABLE 5-continued

|  |  | Example 12 | Example 13 | Example 14 | Example 15 | Example 16 |
|---|---|---|---|---|---|---|
| by mass) | Clay (note 5) | 5 | 15 | 30 | 40 | 15 |
|  | Silane coupling agent (note 6) | 5.6 | 5.6 | 5.6 | 5.6 | 5.6 |
|  | Curable resin (note 7) | 12 | 12 | 12 | 12 | 12 |
|  | Vegetable oil (note 8) | 3 | 3 | 3 | 3 | 3 |
|  | Stearic acid (note 9) | 2 | 2 | 2 | 2 | 2 |
|  | Zinc oxide (note 10) | 3 | 3 | 3 | 3 | 3 |
|  | Sulfur (note 11) | 3.0 | 3.0 | 3.0 | 3.0 | 3.0 |
|  | Vulcanizing accelerator (note 12) | 2.5 | 2.5 | 2.5 | 2.5 | 2.5 |
| Evaluation | Rubber hardness | 84 | 85 | 85 | 85 | 85 |
|  | Mooney viscosity index | 135 | 120 | 100 | 90 | 120 |
|  | Garvey die extrusion characteristic | B-A | A | A | A | A |
|  | Extrusion processability | A | A | A | A | A |
|  | E*(MPa) | 43 | 42 | 44 | 43 | 43 |
|  | tanδ | 0.150 | 0.148 | 0.145 | 0.147 | 0.147 |
|  | Tensile strength (TB) (MPa) | 15.2 | 14.5 | 14.0 | 14.7 | 14.7 |
|  | Breaking elongation (EB) (%) | 200 | 190 | 180 | 195 | 195 |
|  | Tire steering stability | A | A | A | A | A |
|  | Tire durability | A | A | A | A-B | A |

In Table 4 and Table 5, notes 1 to 12 are explained as follows:

Note 1: Natural rubber is "TSR".
Note 2: Epoxidized natural rubber is "EPDXYPRENE25" (epoxidation ratio: 25%) manufactured by Mu-ang Mai Guthrie Public Company Limited (That).
Note 3: Carbon black is "Showblack N330" (BET specific surface area: 79 m²/g) manufactured by Cabonet Japan K.K.
Note 4: Silica is "VN2" (BET specific surface area: 125 m²/g) manufactured by Evonik Degussa Japan Co., Ltd.
Note 5: Clay is "Satenton W" manufactured by Takehara Kagaku Kogyo Co., Ltd.
Note 6: Silane coupling agent is "Si69", manufactured by Evonik Degussa Japan Co., Ltd.
Note 7: Curable resin is "Sumilite Resin PR12686" manufactured by Sumitomo Durez Co., Ltd.
Note 8: Vegetable oil is "Rapeseed Oil" manufactured by Nissin Kasei Corporation.
Note 9: Stearic acid is "Stearic acid" manufactured by Nippon Oil & Fats Co., Ltd.
Note 10: Zinc oxide is "Zinc White No. 1" manufactured by Mitsui Mining & Smelting Co., Ltd.
Note 11: Sulfur is "Powdery Sulfur" manufactured by Turumi Chemicals Co., Ltd.
Note 12: Vulcanizing accelerator is "Nocceller NS" manufactured by OUCHI SHINKO CHEMICAL INDUSTRIAL CO., LTD.

As shown in Table 4 and Table 5, in Comparative Example 6 in which only the carbon black was blended as an inorganic filler, the tan δ index was high, and in Comparative Examples 7 and 8 in which only the carbon black and silica were blended as the inorganic filler, the Mooney viscosity was high with the result that the processability becomes inferior, although the tan δ index was reduced in comparison with that of Comparative Example 6. Moreover, in Comparative Example 9 in which the compounding amount of clay is low, the processability was not good, with the E* index being low, and in Comparative Example 10 in which the compounding amount of clay is high, the durability was not good. In contrast, Examples 12 to 16, which are examples of the present invention in which the silica and clay are blended in combination so as to become the same amount as the compounding amount of silica of Comparative Example 7, tends to have superior rubber physical properties, tire steering stability and tire durability, with a reduced tan δ index in comparison with that of Comparative Example 7.

Moreover, Examples 12 to 16 have a reduced Mooney viscosity in comparison with that of Comparative Example 7 so that the processability, evaluated as Garvey die extrusion characteristic and extrusion processability, is superior. Therefore, the present invention makes it possible to provide a rubber composition for bead apex that has high rigidity and a low heat-generating characteristic and is also superior in processability upon preparation.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A rubber composition for a bead apex rubber for a tire, comprising:
    a rubber component containing a natural rubber component consisting of at least either a natural rubber or an epoxidized natural rubber; and
    an inorganic filler containing at least silica, carbon black, and calcined kaolin having a particle size of 0.3 to 5 µm, wherein
    the mass ratio of said natural rubber to said epoxidized natural rubber in said natural rubber component is 100:0 to 50:50,
    the amount of said silica is set in a range of 30 to 65 parts by mass relative to 100 parts by mass of said rubber component,
    the amount of said carbon black is set in a range of 1 to 5 parts by mass relative to 100 parts by mass of said rubber component,
    the amount of said kaolin is set in a range of 5 to 40 parts by mass relative to 100 parts by mass of said rubber component, and
    the total amount of said silica and kaolin is set to 65 to 85 parts by mass relative to 100 parts by mass of said rubber components.

2. The rubber composition according to claim 1, wherein the amount of said inorganic filler is set to 70 parts by mass or more relative to 100 parts by mass of said rubber component.

3. The rubber composition according to claim 1, wherein said rubber component consists of said natural rubber component.

4. The rubber composition according to claim 1, wherein a durometer hardness is set in a range from 70 to 95.

5. A pneumatic tire comprising a bead apex rubber consisting of the rubber composition according to claim 1.

6. A bead apex rubber for a tire, having a rubber composition which comprises:
  a rubber component containing a natural rubber component consisting of at least either a natural rubber or an epoxidized natural rubber; and
  an inorganic filler containing at least silica, carbon black, and calcined kaolin having a particle size of 0.3 to 5 μm, wherein
    the mass ratio of said natural rubber to said epoxidized natural rubber in said natural rubber component is 100:0 to 50:50,
    the amount of said silica is set in a range of 30 to 65 parts by mass relative to 100 parts by mass of said rubber component,
    the amount of said carbon black is set in a range of 1 to 5 parts by mass relative to 100 parts by mass of said rubber component,
    the amount of said kaolin is set in a range of 5 to 40 parts by mass relative to 100 parts by mass of said rubber component, and
    the total amount of said silica and kaolin is set to 65 to 85 parts by mass relative to 100 parts by mass of said rubber component.

\* \* \* \* \*